(No Model.)

J. H. SHERIDAN.
LIFTING JACK.

No. 558,427. Patented Apr. 14, 1896.

Witnesses:
L. C. Hills
E. H. Bond

Inventor
James H. Sheridan,
by E. B. Stocking
Atty.

ANDREW B.GRAHAM, PHOTO-LITHO. WASHINGTON, D.C.

UNITED STATES PATENT OFFICE.

JAMES H. SHERIDAN, OF FLUSHING, NEW YORK, ASSIGNOR OF NINE-SIXTEENTHS TO JOHN H. DALE AND PHILIP FARRELL, OF BROOKLYN, NEW YORK.

LIFTING-JACK.

SPECIFICATION forming part of Letters Patent No. 558,427, dated April 14, 1896.

Application filed April 23, 1895. Serial No. 546,907. (No model.)

*To all whom it may concern:*

Be it known that I, JAMES H. SHERIDAN, a citizen of the United States, residing at Flushing, in the county of Queens, State of New York, have invented certain new and useful Improvements in Lifting-Jacks, of which the following is a specification, reference being had therein to the accompanying drawings.

This invention relates to certain new and useful improvements in lifting-jacks of that class in which is employed a worm and a worm-gear through the medium of which the power is applied.

It is designed more especially as an improvement upon the construction shown in my patent dated April 30, 1895, and numbered 538,392.

It has for its objects, among others, to improve upon the prior construction, make the jack more durable and efficient, requiring less power to operate it, and dispensing with some of the elements required in the construction set forth in the patent. I provide ball-bearings upon opposite sides of the worm-gear to take all of the side thrust of the said gear. The screw and worm gear are in one piece; and I provide a novel form of bearings for the balls arranged at a point between the under face of the worm-gear and the lower end of the screw portion thereof to provide an automatic self alinement or adjustment of the parts. I also provide an improved form of latch for holding the parts in their adjusted position, locking the shell and the stand together, the latch and its spring being so formed and constructed as to prevent the latch from falling back when thrown out, thus enabling the operator to have it at all times under perfect control. The stand is made hollow so that it may contain a lubricant into which the screw may project, thus rendering it self-lubricating.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1:
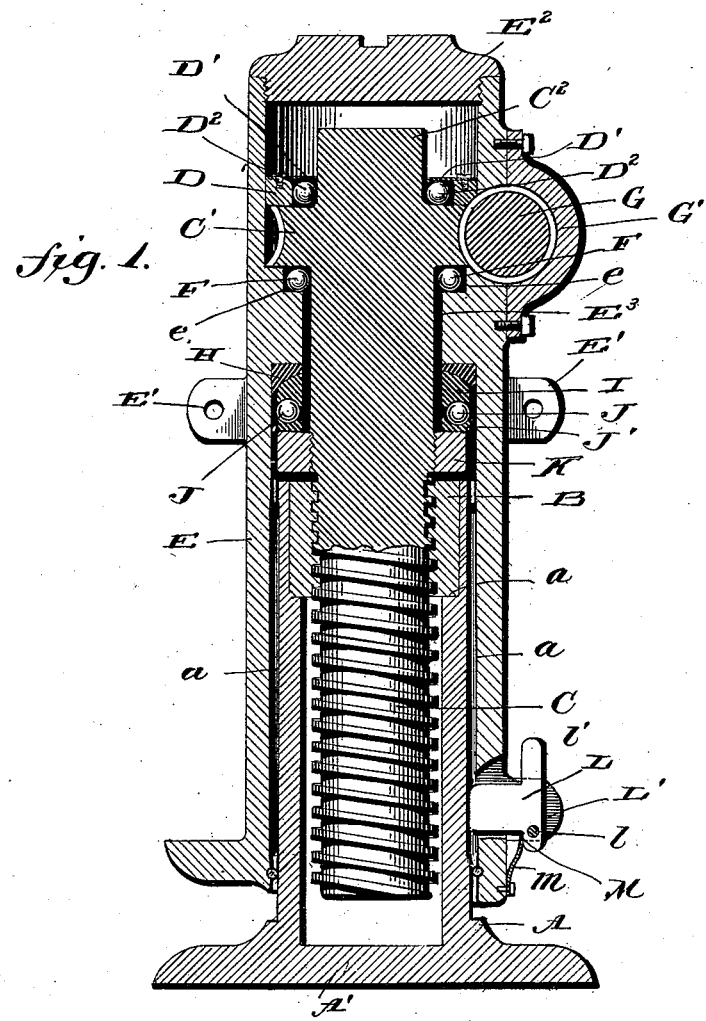
Figure 2:
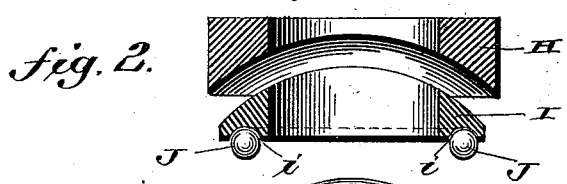
Figure 3:

Figure. 1 is a substantially central vertical section through a lifting-jack constructed in accordance with my invention. Fig. 2 is a central vertical section through the self-adjusting ball-bearings. Fig. 3 is a top plan of the central portion of said bearings, being the under one seen in Fig. 2.

Like letters of reference indicate like parts throughout the several views.

Referring now to the details of the drawings by letter, A designates the stand with a suitable base A' and with one or more vertical slots or grooves $a$, as seen in Fig. 1, the object of which will hereinafter appear. Near its upper end this stand is formed with an annular socket or shoulder $a'$, in which is fitted the nut B, as seen in Fig. 1, and which is adapted to receive the screw C, which near its upper end is formed with an integral worm-gear C', the shank extending slightly above the gear, as shown at $C^2$.

D is a ring arranged above the worm-gear within the casing or shell E, and to the upper face of this ring is secured a plate D', having a central opening, through which passes the extension $C^2$ of the worm-gear, and between this plate and the upper face of the gear are arranged the balls or rollers $D^2$, the plate in this instance being shown as secured to the ring by screws, so that it may be readily detached when desired.

The shell or casing E is sleeved over the stand A and is provided with lugs or ears E', having apertures, said ears forming handles, or the apertures designed to receive handles, by which the jack may be carried about from place to place and more easily handled. The casing or shell has a detachable cap or top $E^2$, in this instance shown as secured thereto by screw-threaded engagement, but this is immaterial. The shell or casing is formed with an inwardly-extending annular portion $E^3$, located below the worm-gear, and this portion, near its upper end, is offset or formed with an annular channel $e$, into which are arranged the balls or rollers F, which are confined between the horizontal wall thereof and the under face of the worm-gear, all as clearly seen in Fig. 1.

The worm-gear is designed to mesh with a worm G, arranged at right angles thereto, as shown, and having suitable bearing in the shell or casing, the cap or portion G' of the box or bearing being made detachable, as shown in Fig. 1, for the purpose of permitting easy assemblage of the parts or of separation thereof for the purpose of repairs or other objects.

The outer shell or casing has its bore somewhat larger than the stand, as shown, so as to provide for movement of the latter within the former, and this provides for the proper working of the self-adjusting ball-bearing now to be described.

H is a ring located within the shell or casing with its upper face bearing against the under face of the inwardly-extending portion $E^3$ thereof, while its under face is curved, as seen best in Fig. 2, and against this under curved face is fitted the convex upper face of the ring or plate I, (shown also in Fig. 2,) the said plates or rings H and I having, of course, central apertures through which the shank of the screw passes, and the under face of the ring or plate I is formed with an annular groove or channel I, in which work the balls or rollers J, beneath which is a plate J', having upon its upper face an annular groove or channel into which the said balls also work. This plate J' rests upon the ring K, threaded upon the shank of the screw C just above where the threads thereof engage the nut B, all as clearly shown in Fig. 1. By this means when an angular lift is taken on the top of the jack it will rock on the rings H and I and the balls and adjust itself, at all times keeping an even bearing on the balls. The ring should be of hardened steel, and also the balls.

The parts are all protected from dirt or grit, and end and side thrust is taken up by balls and great weight may be lifted with the exertion of but little power.

L is a latch hung upon pivots $l$ near its lower corner, said pivot being held between lugs L', projecting from the lower end of the casing or shell, as seen in Fig. 1, the said latch having a horizontal portion extending through a slot or passage-way $l'$ and extending into a groove $a$ of the stand to prevent rotation of the same.

$m$ is a spring secured at one end to the shell or sleeve and its other end bearing against a shoulder M on the under side of the horizontal portion of the latch near the pivot thereof. The construction is such that by drawing down on the latch by reason of the thumb-piece at the upper end it will swing clear of the slot in the stand and allow the sleeve or shell to be revolved, the spring riding over the lower extension of the latch and holding the same in its unlocked position, thus holding the latch from falling back when once thrown out and pressure removed and enabling the operator to have it at all times under perfect control. When thrown in, it is held within the slot or groove $a$ in the stand by the action of the spring and locks the parts against rotation.

Modifications in detail may be resorted to without departing from the spirit of the invention or sacrificing any of its advantages.

What I claim as new is—

1. The combination with the base and the nut, of a casing sleeved over said base, the worm-gear with integral threaded shank engaging said nut, a worm meshing with said gear, and the balls above and below and bearing against the said gear, substantially as described.

2. The combination with the base and the nut therein, of the shell sleeved over the base, the worm mounted in the shell, the worm-gear meshing therewith and having a depending threaded portion engaging said nut and a self-adjusting ball-bearing through which the shank passes, substantially as described.

3. The combination with the base and the nut therein, of the shell sleeved over the base, the worm mounted in the shell, the worm-gear meshing therewith and having a depending threaded portion engaging said nut, a self-adjusting ball-bearing through which the shank passes, and balls upon opposite faces of the worm-gear, substantially as described.

4. The combination with the base and its nut, of the shell sleeved over the same and having inwardly-extending portion, the worm-gear with its integral threaded shank, the worm meshing therewith, the ring on the shank above the nut and the ball-bearing between said ring and the inwardly-extending portion of the shell and balls bearing upon the upper and lower faces of the said gear, substantially as described.

5. The combination with the base and its nut, of the shell sleeved over the same and having inwardly-extending portion, the worm-gear with its threaded shank, the worm meshing therewith, the ring on the shank above the upper end of the tubular portion of the base and above said nut, the ball-bearing between said ring and the inwardly-extending portion of the shell, and balls arranged upon opposite faces of the worm-gear, substantially as described.

6. The combination with the base and its nut, and the casing sleeved thereover and having inwardly-extending portion above said nut, of the worm-gear with its screw-threaded shank engaging said nut, the worm meshing with the gear, the ring on the shank above the nut and the self-adjusting ball-bearing mechanism comprising a ring having curved under face, and plate having convex upper face fitting said curved under face, a plate with an annular groove and balls interposed between the same and the convexed plate, all arranged between said ring and the under face of the inwardly-extending portion of the casing, substantially as described.

7. The combination with the base and its nut, and the casing sleeved thereover and having inwardly-extending portion above said nut, of the worm-gear with its screw-threaded shank engaging said nut, the worm meshing with the gear, the ring on the shank above the nut and the self-adjusting ball-bearing mechanism between said ring and the under face of the inwardly-extending portion of the casing, the balls between the upper face of the said inwardly-extending portion and the lower face of the worm-gear and the balls acting on the upper face of the worm-gear, substantially as described.

8. The combination with the stand and its nut, of the shell sleeved thereover and having inwardly-extending portion, the worm-gear having depending screw-threaded shank engaging the said nut, the ring on the shank above the nut, the worm engaging the gear, the ring around the shank of the gear below said inwardly-extending portion and having curved under face, the ring with curved upper face fitted thereto and having an annular groove upon its under face, the ring arranged beneath the same and having a groove in its upper face, and the balls held between and in the channels or grooves of the two last-mentioned rings, substantially as described.

9. The combination with the base and stand having vertical groove or channel, of the outer casing or shell, a latch pivoted thereon and having a horizontal portion adapted to enter said groove or channel and an integral vertical portion extended above and below the pivot and below the pivot formed with a shoulder and a spring mounted on the shell and adapted to act on the said shoulder of the latch near its pivot to hold the same in either its locked or unlocked position, substantially as and for the purpose set forth.

In testimony whereof I affix my signature in presence of two witnesses.

JAMES H. SHERIDAN.

Witnesses:
FRANK S. OBER,
JOHN H. DALE.